March 11, 1952　　M. T. GOBLE　　2,588,979
NUT-CRACKING IMPLEMENT
Filed April 30, 1948　　2 SHEETS—SHEET 2
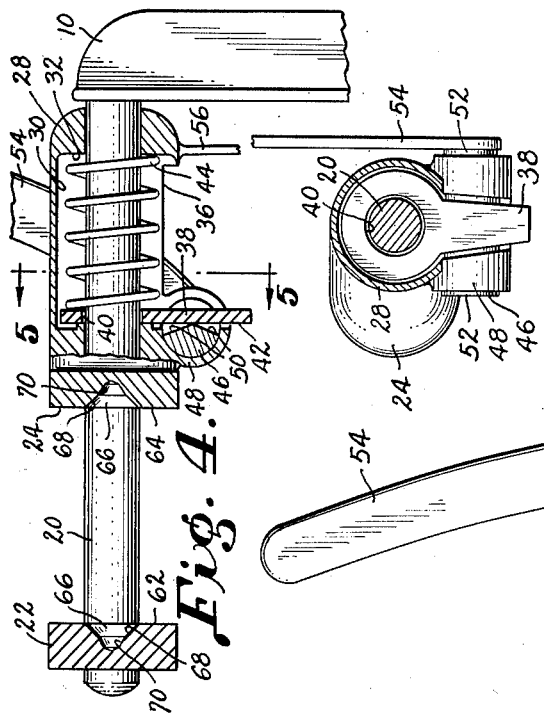
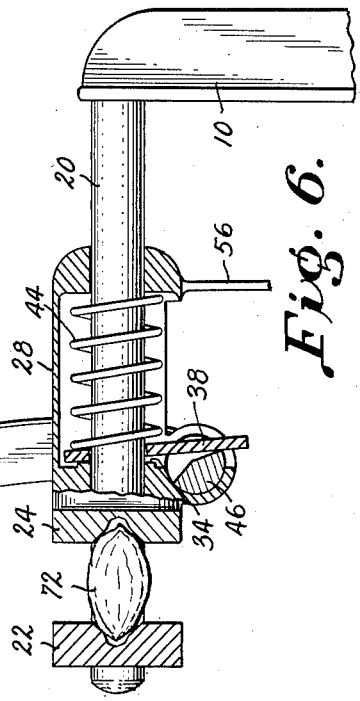
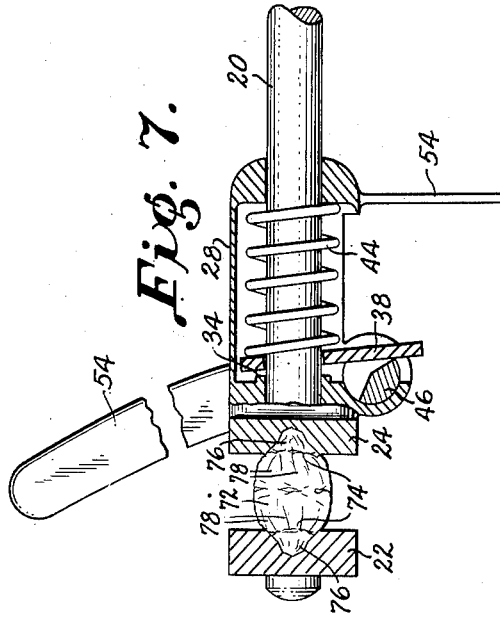
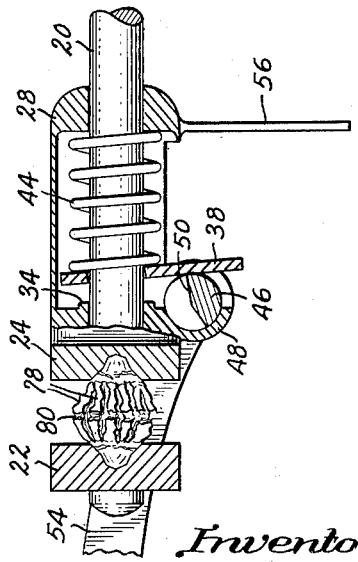
*Inventor:-*
MERRITT T. GOBLE,
By *Raymond Whotton*
*Attorney*

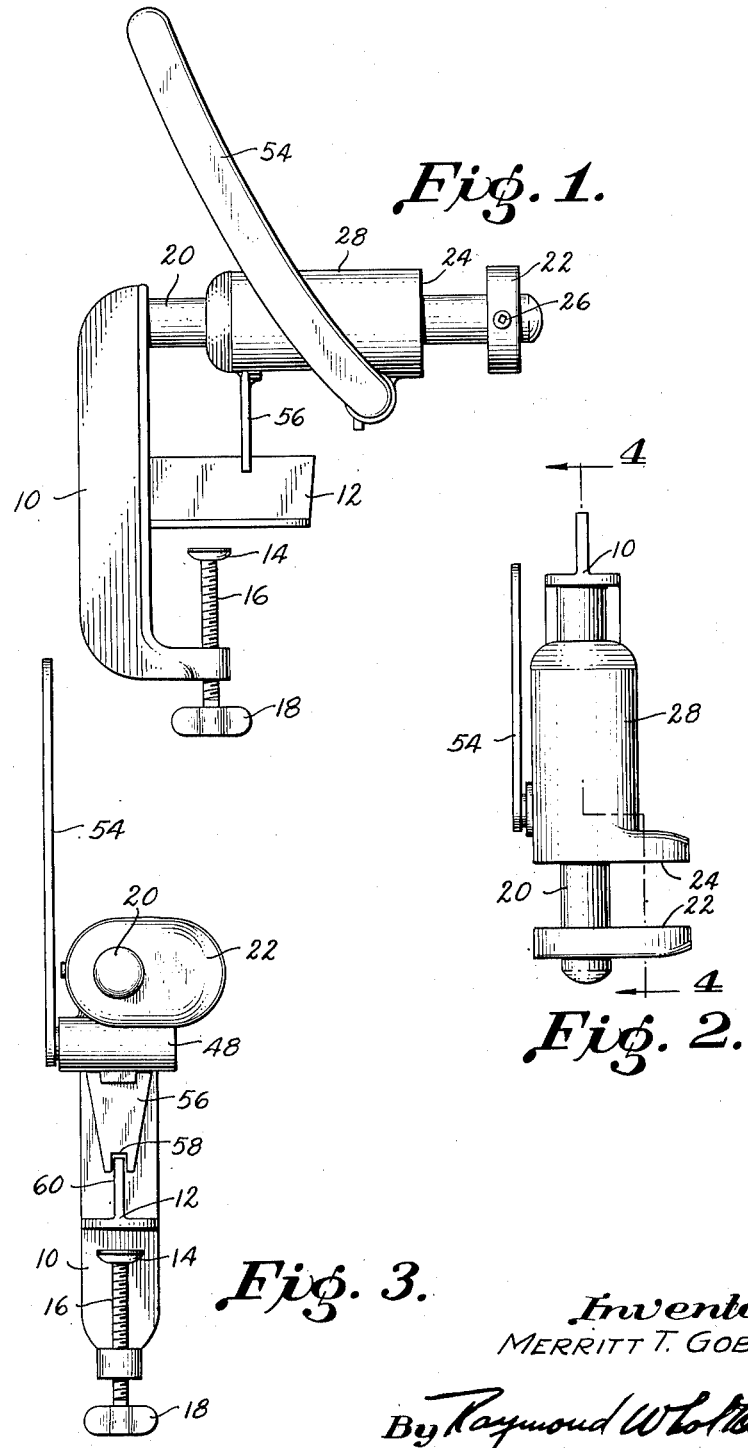

UNITED STATES PATENT OFFICE 2,588,979

NUT-CRACKING IMPLEMENT

Merritt T. Goble, Muskogee, Okla.

Application April 30, 1948, Serial No. 24,400

1 Claim. (Cl. 146—16)

The implement constituting the present invention, while primarily intended for use as a nut cracker, is inherently applicable to other uses such as clamping, pressing and pushing.

The implement comprises a frame, a head defining a jaw movably carried by the frame, a detent movable with the head relative to the frame, a detent operator movable with the head and shiftable to temporarily secure the detent to the frame and further shiftable to advance the jaw with respect to the frame. A second jaw may be relatively fixed in any adjusted position on the frame in order that the work, such as a nut to be cracked, will be engaged between these jaws. The detent operator may assume the form of a cam, which cam may be arcuate and rotatably adjustable through a given angle to produce its securing effect and through a further angle to perform the advancing function. By the suitable provision of lost motion, the throw of the detent operator to produce the securing effect can be accurately predetermined, and the stroke through which the jaw is advanced can likewise be accurately predetermined. Thus the foreshortening effect imposed upon the work, such as a nut to be cracked, can be definitely limited so that in the case of a nut, the meat will receive the least possible damage consistent with cracking the shell sufficiently for ready removal of the meat.

The detent is normally maintained in its released condition by means of a spring interposed between it and a portion of the head, and accordingly movement of the detent operator will occur in opposition to the force of the spring. In a highly satisfactory form of the invention, the detent operator is shiftable to cant the detent into binding relationship with respect to the frame. Suitable guide means is contemplated for maintaining the movable jaw in a predetermined path.

More specifically, the invention contemplates an implement for cracking nuts comprising a frame, a pair of opposed jaws supported on the frame, the jaws providing aligned nut receiving sockets, a head movably carrying one of the jaws with respect to the frame, a normally released detent movable with the head relative to the frame, a rotatable cam movable with the head and shiftable through an arc to temporarily secure the detent to the frame and shiftable through a further arc to advance the movable body through a predetermined stroke with respect to the frame and the other jaw.

At least one of the jaws constituting a pair used in the nut cracking implement of the present invention contains a nut receiving socket providing intersecting surfaces of unequal convergence, and preferably each of the jaws is provided with such a socket aligned with the other. The socket or sockets thus formed are preferably closed at one end and the intersecting surfaces are preferably of diminishing convergence as they recede from the proximate jaw surfaces. The proximate convergent surface may advantageously posses an included angle approximating a right angle while the remote convergent surface may posses an acute included angle, the convergent surfaces preferably being frusto-conical and intersecting in a curved line defining a circle. Jaws containing sockets thus defined are eminently suited for removing the shells from pecans, since they tend to preserve small cap-like end portions of the shell substantially unbroken to protect the meat against unnecessary crushing or breakage. Then as the jaw is advanced, the shell is broken circumferentially adjacent to these end portions, then longitudinal splitting of the shell will follow, and ultimately after the proximate convergent surfaces engage the shell, circumferential cleavage occurs in the medial area of the nut.

The relative freedom of adjustability of the movable jaw while the detent is in its released condition, permits the implement to adapt itself readily to an object of any size within that for which it is designed, whereupon, movement of the operating handle provides an advancing movement the extent of which can be very carefully computed and controlled.

A more complete understanding of the invention will follow from a detailed description of the drawings wherein:

Fig. 1 is an elevation of a nut cracker embodying the invention;

Fig. 2 is a plan view of the nut cracker of Fig. 1;

Fig. 3 is an end elevation of the implement shown in Fig. 1;

Fig. 4 is a sectional elevation taken along line 4—4 of Fig. 2;

Fig. 5 is a section taken along line 5—5 of Fig. 4;

Figs. 6, 7 and 8 are fragmentary sections illustrating progressive stages in the cracking of a nut.

The nut cracker depicted in the drawings comprising a frame made up of a vertical post 10 formed from a T-section to an intermediate portion of which is secured a horizontal jaw 12 formed from a T-section which cooperates with a movable jaw 14 carried by a screw 16 and adjustable by manipulation of the winged thumb piece 18. At the upper portion of the frame there is a horizontal rod or rail 20 secured to the face of the vertical post 10 for supporting the relatively fixed work engaging jaw 22 and the relatively movable work engaging jaw 24. Whereas the jaw 22 has been characterized as relatively fixed, its position on the frame may actually be adjusted by means of a set screw 26 which likewise serves in the assembly and disassembly of the parts.

The relatively movable jaw 24 is carried by a head 28 having an intermediate tubular portion 30 extending between a rear abutment 32 and a forward abutment 34 defined by the ends of the head which are perforated to permit free sliding movement on that portion of the frame defined by the rod 20. The head is provided with a longitudinal slot 36 at its lower portion, the slot being substantially coextensive with the tubular part of the head. A detent 38 contains an opening 40 slightly larger than the rod 20 which it embraces, but small enough that the detent will enter into binding engagement with the rod when it is canted through a small angle when the lower projecting end 42 of the detent receives a counterclockwise movement. The detent is normally biased to its released position by means of a coil spring 44 interposed between it and the rear abutment 32 of the head.

A detent operator 46 comprises a rotatable cam received in a barrel 48 a portion of whose wall is transversely slotted to receive the projecting end 42 of the detent 38. The cam faces 50 are formed on the detent operator intermediate its cylindrical ends 52 which serve as bearings for rotation of the operator by actuation of the operating handle 54 secured thereto.

With the parts in the positions depicted in Fig. 4 of the drawings, the detent assumes its released position permitting ready sliding of the head along the rod 20. To maintain alignment of the jaws, a guide member 56 depending from the rear end of the head is provided with a notch 58 in its lower edge which receives the web 60 of the T-section 12.

The proximate faces 62 and 64 of the jaws 22 and 24 respectively are provided with aligned sockets 66 for the reception of nuts to be cracked. These sockets are defined by a relatively convergent bore 68 intersecting a less convergent bore 70 extending to the closed end of each socket. Excellent results have been achieved in cracking pecans with this device where the angle included by the more convergent bore 68 approximates a right angle and where the angle included by the bore of less convergence is acute, and in the neighborhood of 65 degrees.

Starting with the implement in the position depicted in Fig. 4, with the detent in its released position as shown, the head 28 as an entirety can be moved along the rod 20 until the jaws 22 and 24 have assumed a position in which their sockets 66 receive the ends of a nut 72 as depicted in Fig. 6. The detent operator 46 has been shifted through a small arc as shown in Fig. 6 so that the detent 38 has been canted in opposition to the action of the spring 44 so that it enters into binding engagement with the frame member or rod 20 so that further movement of the detent operator in the same direction by manipulation of its handle 54 will advance the head 28 and its jaw 24 towards the relatively fixed jaw 22, the detent 38 now being for all practical purposes a temporarily fixed part of the frame, now serving as one abutment for the spring 44 in opposition to which, advancement of the head and jaw will be effected.

A partially advanced position of the head 28 has been depicted in Fig. 7, the handle 54 and detent operator 46 having been moved through a further arc so that the forward abutment 34 of the head is no longer in contact with detent 38 and the jaws 22 and 24 are now closer together. By virtue of the shape and relation of the convergent surfaces defining the sockets in the jaws, the cracking effect first noted occurs near the ends of the shell slightly beyond the intersection of the unequally convergent surfaces. Such initial cleavage produces cracks 74 tending to preserve small cap like end portions 76 of the shell substantially unbroken to protect the meat against unnecessary crushing or breaking. The next effect noted as the jaws relatively advance is the occurrence of longitudinal cracks 78, the final condition approaching that depicted in Fig. 8 wherein circumferential cleavage occurs in the medial area of the nut as represented by the break 80. The relative positions of the operating handle and detent operator have advanced accordingly in this figure and the forward abutment 34 of the head has received its maximum displacement with respect to the detent 38.

It will be clear that the length of the stroke of the head 28 and its jaw 24 should be accurately computed and controlled to suit the various specific uses for which the implement is intended. By varying the shape of the detent operator or cam, the characteristics of the stroke including the length can be varied over a wide range. The length of the stroke can also be varied by modifying the forward abutment 34 originally, or by introducing or removing spacing washers between this abutment and the detent.

Whereas only one form of the invention has been illustrated and described in detail, variations and modifications will occur to others skilled in the art as they have been recognized already by the present inventor and accordingly, the invention should not be restricted beyond the scope of the appended claim.

I claim:

An implement for cracking nuts of a type having a tapered end comprising a pair of relatively movable jaws, said jaws containing nut receiving sockets each providing a proximate convergent surface having an included angle approximating a right angle contiguous to and intersecting a remote convergent surface having an acute included angle.

MERRITT T. GOBLE.

REFERENCES CITED

The following references are of record in the file of this patent:

UNITED STATES PATENTS

| Number | Name | Date |
|---|---|---|
| 1,061,470 | Gradick | May 13, 1913 |
| 1,087,617 | Traver | Feb. 17, 1914 |
| 1,567,884 | Woldert | Dec. 29, 1925 |
| 2,157,501 | Settle | May 9, 1937 |
| 2,200,515 | Moeller | May 14, 1940 |